L. R. REEDER.
ELASTIC VEHICLE TIRE.
APPLICATION FILED SEPT. 21, 1916.
1,215,577. Patented Feb. 13, 1917.
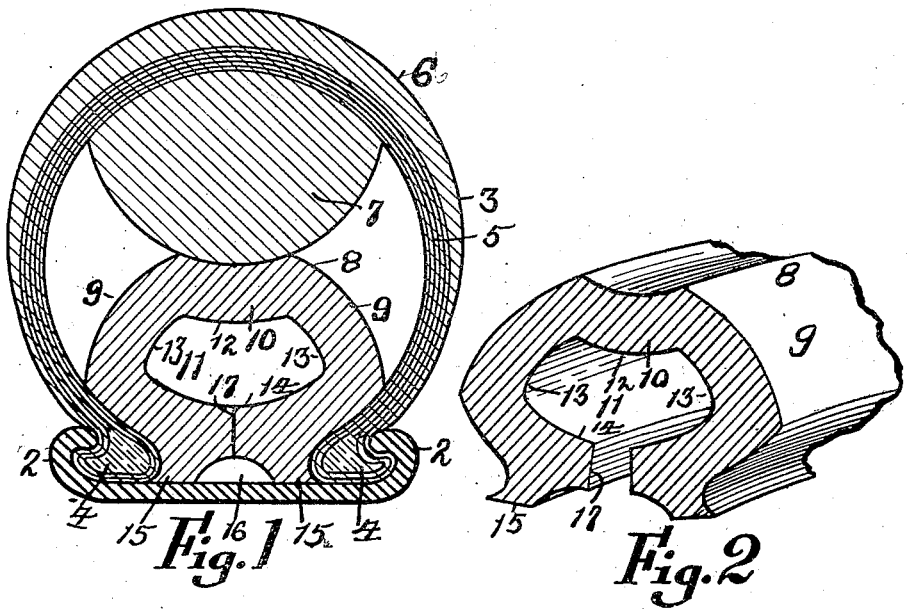
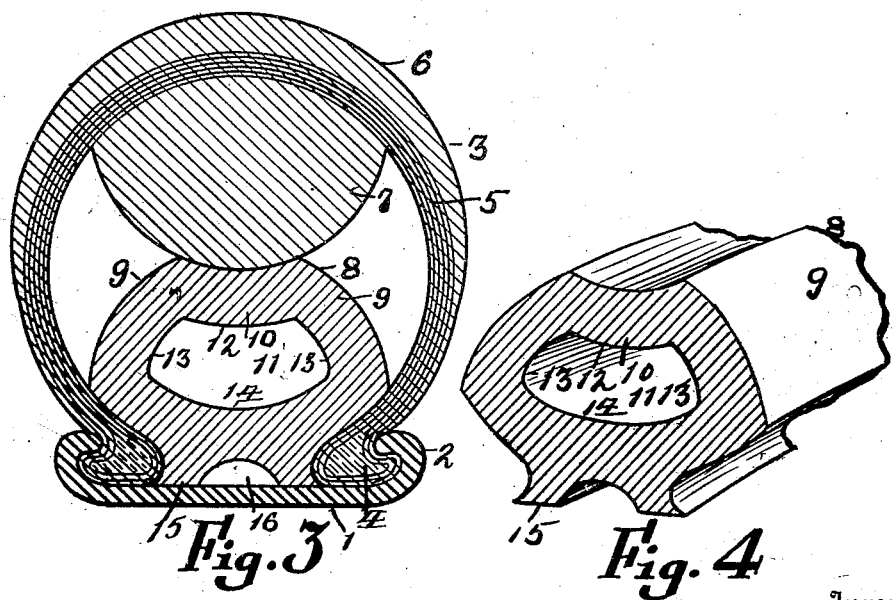
Inventor
Lester R. Reeder,
C. E. Humphrey
Attorney

UNITED STATES PATENT OFFICE.

LESTER R. REEDER, OF AKRON, OHIO, ASSIGNOR OF ONE-HALF TO WILBERT J. QUILLEN, OF AKRON, OHIO.

ELASTIC VEHICLE-TIRE.

1,215,577.             Specification of Letters Patent.     Patented Feb. 13, 1917.

Application filed September 21, 1916. Serial No. 121,486.

*To all whom it may concern:*

Be it known that I, LESTER R. REEDER, a citizen of the United States, residing at Akron, in the county of Summit and State of Ohio, have invented new and useful Improvements in Elastic Vehicle-Tires, of which the following is a specification.

This invention relates to improvements in elastic vehicle tires of the type which are commonly known as "puncture proof or non-puncturable" wherein the resiliency and elasticity of the tire do not reside in the incorporation in the tire of an inflated air tube.

The object of the invention is to provide an elastic tire for use on vehicles wherein the resiliency and elasticity thereof is supplied by means other than an inflated air tube but on the contrary depend upon a suitably positioned arrangement of resilient elements which combine to hold the tire in its normal expanded position and by the resiliency of the materials to return it to this position after its distortion due to engagement with the roadway.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a transverse sectional view of a vehicle wheel rim and a tire embodying this invention mounted thereon.

Fig. 2 is a combined sectional and perspective view of a form of reinforcing element incorporated in the tire rim shown in Fig. 1.

Fig. 3 is a view similar to Fig. 1 with a slightly different form of reinforcement incorporated therein, and Fig. 4 is a combined sectional and perspective view of the reinforcement incorporated in the tire shown in Fig. 3.

The general structure of the tires shown in Figs. 1 and 3 is substantially identical and hence similar reference numerals will be applied to both in so far as they are appropriate.

The tire is adapted to be seated in a clencher rim comprising a tire seat 1 and side clencher flanges 2 of the usual type. The outer portion of the tire comprises a carcass 3 provided with lateral beads 4 for coöperation with the flanges 2 and the carcass is provided with the usual fabric reinforcing layers 5 and a tread 6. The carcass so far as described is substantially similar to those ordinarily employed in connection with a pneumatic tire wherein an inner inflatable tube is employed. Extending circumferentially of the inner tread face of the carcass 3 is an inwardly-projecting rib 7 of resilient material such as vulcanized rubber and this rib is preferably semicircular in cross section with the inner portion or periphery thereof slightly below the radial central line of the carcass 3. The resiliency of the tire depends considerably upon the composition or nature of the inwardly-projecting rib 7 and experience has demonstrated that this rib should be made of a rubber composition which possesses considerable elasticity and sufficient toughness and hardness to withstand and resist wear due to the use of the tire. The inwardly extending rib 7 while preferably semicircular in cross section may have other cross sectional configuration if so desired and the invention is not limited by the showing of a cross section of a semi-circular rib.

Positioned within the carcass 3 and extending radially between the inner face of the rib 7 and the outer face of the rim 1 is a complemental member 8 adapted to be associated with the rib for furnishing the desired amount of resilience and elasticity to the entire tire. This reinforcing or coöperating element may be made as shown in Figs. 1 and 2 or be made as shown in Figs. 3 and 4, the difference in the forms being due solely to the method of manufacture as will appear later. The reinforcing element comprises a circumferential extending member denominated generally by the reference numeral 8 preferably formed of molded rubber and while annularly fashioned it may be formed of straight sections with the ends thereof arranged in abutting relation. The member 8 preferably comprises a pair of arch or arcuate side walls 9 united at their outer ends to form a wall 10 the upper face of which is fashioned to be in approximate coincidence with the inner face of the rib 7 and furnish a seat therefor; that is to say if the rib 7 is semi-circular in cross section the upper face of the wall 10 will be provided with a groove or a concave indentation approximating in curvature the curvature of the face of the rib 7. The member 8 is provided with a circumferentially extending opening 11 the upper face 12 of which is approximately concentric with the curvature of the upper face of the wall 10 so that both the outer and the inner faces of the wall 10 are in approximate parallelism. The side faces 13 of the walls 9 are preferably approximately parallel with the outer faces of the wall 9. The inner face 14 of the opening 11 is formed upon curvilinear lines and preferably in an arc of a circle of a smaller radius than the arc described by the upper face 12 of the wall 10. The opening 11 is positioned approximately midway between the outer face of the member 8 and the rim 1, and the lateral walls 9 of the member terminate against the inner faces of the side walls of the carcass 3 and seat thereon and with their inner portions 15 resting against the outer tire seat of the rim 1. Extending circumferentially of the rim engaging portion of the member 8 is an opening 16 preferably approximately semi-circular in cross section thereby forming the two rim engaging ribs 15 arranged on opposite sides of the opening 16. By one method of manufacture the wall between the openings 11 and 16 is provided with a circumferential slit or cut 17 but this slit is not present where the member 8 is made by an entirely different method.

Either one of two methods may be employed for making the member 8.

The member 8 may be made, for instance, upon a suitable core which forms the opening 11 and in this case in order to remove the core from the opening 11 it is necessary to provide a circumferential slit 17 to permit the withdrawal of the core from the finished product. On the other hand it is entirely possible to make the member 8 in what is known as a tube machine wherein a central mandrel forms the opening 11 and hence no necessity for slitting the wall between the openings 11 and 16 exists and the product will take the form shown in Figs. 3 and 4.

The tire is assembled for use by placing the rim engaging beads 4 in position, with the reinforcing member 8 positioned between the rim 1 and the inwardly extending rib 7. Under certain conditions any depression upon the tread 6 of the tire will be resisted by the resiliency of the rib 7 and the resiliency of the reinforcing member 8 which forms a part of the structure of this invention and comprising an arch or arcuate shaped structure having a normal tendency to return to the shape shown in the drawings after distortion by the engagement of the tire with the roadway. It is not contemplated that the opening 11 will carry a charge of air under pressure as is the function with an ordinary inner tube but on the contrary the resiliency of the tire against the distortion is furnished by the member 8 and the rib 7. It will be further noted that by inwardly distorting the member 8 due to contact with the roadway the inner portions 15 of the member 8 lock the side beads 4 of the carcass firmly under the overhanging clencher flanges 2 of the rim and by positioning the inner bearing faces of the side walls 9 of the member 8 upon the inner faces of the side walls of the carcass the member 8 affords a substantially resilient cushion for preventing inward movement of the rib 7 and cushions the inward movement thereof.

I claim,

An elastic vehicle tire comprising an annular carcass the lateral edges of which are provided with hook shaped beads for co-operation with the clencher flanges of a rim, said carcass provided on the inner face of the tread portion thereof with a circumferentially-extending inwardly-projecting rib, said rib formed of an elastic and resilient material, and a reinforcing element positioned within said carcass between said rib and said rim, said reinforcing element provided on its outer face with a groove approximating the formation of the inner face of said rib and constituting a seat therefor, said reinforcing element provided with a longitudinally-extending opening centrally disposed thereof to thereby provide a pair of arcuate side walls the inner faces of which are seated upon the inner faces of the side walls of said carcass, the inner face of said reinforcement along said rim being provided with a circumferentially-extending groove to provide two spaced ribs adapted to seat on said rim.

In testimony whereof I have hereunto set my hand.

LESTER R. REEDER.